United States Patent [19]

Gilley et al.

[11] Patent Number: 4,769,697

[45] Date of Patent: Sep. 6, 1988

[54] PASSIVE TELEVISION AUDIENCE MEASURING SYSTEMS

[75] Inventors: Donald L. Gilley, Danville; Gilbert R. Marguth, Jr., Livermore, both of Calif.

[73] Assignee: R. D. Percy & Company, Seattle, Wash.

[21] Appl. No.: 944,459

[22] Filed: Dec. 17, 1986

[51] Int. Cl.[4] .......................... H04H 9/00; H04N 17/00

[52] U.S. Cl. .......................................... 358/84; 455/2; 250/342

[58] Field of Search .............. 358/84; 455/2; 340/600, 340/567; 250/342

[56] References Cited

U.S. PATENT DOCUMENTS

| | | |
|---|---|---|
| 2,712,976 | 7/1955 | Blaustein et al. . |
| 2,958,766 | 11/1960 | Evans . |
| 2,985,498 | 5/1961 | Freeman . |
| 3,012,179 | 12/1961 | Freeman . |
| 3,056,135 | 9/1962 | Currey et al. . |
| 3,070,798 | 12/1962 | Currey et al. . |
| 3,088,093 | 4/1963 | Freeman et al. . |
| 3,102,685 | 9/1963 | Speiser et al. . |
| 3,143,705 | 8/1964 | Currey et al. . |
| 3,148,245 | 9/1964 | Currey et al. . |
| 3,289,170 | 11/1966 | Currey et al. . |
| 3,323,112 | 5/1967 | Haselwood et al. . |
| 3,372,233 | 3/1968 | Currey . |
| 3,387,797 | 6/1968 | Rahmel et al. . |
| 3,405,393 | 10/1968 | Haselwood . |
| 3,408,629 | 10/1968 | Haselwood . |
| 3,453,641 | 7/1969 | Rahmel . |
| 3,475,608 | 10/1969 | Pardes . |
| 3,483,327 | 12/1969 | Schwartz . |
| 3,512,139 | 5/1970 | Reynolds, Jr. et al. . |
| 3,605,110 | 9/1971 | Southward et al. . |
| 3,651,471 | 3/1972 | Haselwood et al. . |
| 3,733,430 | 5/1973 | Thompson et al. . |
| 3,742,462 | 6/1973 | Haselwood et al. . |
| 3,742,463 | 6/1973 | Haselwood et al. . |
| 3,772,649 | 11/1973 | Haselwood et al. . |
| 3,815,127 | 6/1974 | Blumke et al. . |
| 3,919,479 | 11/1975 | Moon et al. . |
| 3,924,130 | 12/1975 | Cohen et al. . |
| 3,973,206 | 8/1976 | Haselwood et al. . |
| 4,001,613 | 1/1977 | Hills et al. . |
| 4,025,851 | 5/1977 | Haselwood et al. . |
| 4,038,504 | 7/1977 | McAnulty et al. . |
| 4,041,455 | 8/1977 | Norberg . |

(List continued on next page.)

FOREIGN PATENT DOCUMENTS

| | | |
|---|---|---|
| 1389717 | 4/1975 | United Kingdom . |
| 1536414 | 12/1978 | United Kingdom . |
| 1604866 | 12/1981 | United Kingdom ................ 250/342 |

OTHER PUBLICATIONS

Joel Swerdlow, "The Ratings Game," Washington Journalism Review, Sep.-Oct. 1979, pp. 39-45.

Flick and Jones, "A Combinatorial Approach for Classification of Patterns with Missing Information and Random Orientation," IEEE, Transactions on Pattern Analysis and Machine Intelligence, vol. PAMI-8, Jul. 1986, pp. 482-490.

*Primary Examiner*—Keith E. George

*Attorney, Agent, or Firm*—Benoit Law Corporation

[57] ABSTRACT

Methods and apparatus for determining preferences of persons viewing broadcast television programs on television display sets located in rooms of private homes humanly imperceptibly sense proximity of persons to television sets within viewing distance in rooms for which permission to effect such sensing has been obtained. Each such room may be electrically scanned for proximity of one or more persons to a television set. The imperceptibly sensed proximity or the proximity of persons detected by scanning is automatically correlated to television programs broadcast for display by television display sets in the above mentioned rooms and elsewhere, and there is electronically determined from that correlated sensing what broadcast television programs were viewed in which rooms and, optionally, by how many persons.

35 Claims, 3 Drawing Sheets

U.S. PATENT DOCUMENTS

| | | | |
|---|---|---|---|
| 4,044,376 | 8/1977 | Porter | 358/84 |
| 4,048,562 | 9/1977 | Haselwood et al. . | |
| 4,058,829 | 11/1977 | Thompson | 358/84 |
| 4,107,530 | 8/1978 | Brumfield et al. | 250/342 |
| 4,107,734 | 8/1978 | Percy et al. | 358/84 |
| 4,107,735 | 8/1978 | Frohbach | 358/84 |
| 4,196,425 | 4/1980 | Williams, Jr. et al. . | |
| 4,208,652 | 6/1980 | Marshall . | |
| 4,298,860 | 11/1981 | Norberg et al. . | |
| 4,308,554 | 12/1981 | Percy et al. | 358/84 |
| 4,331,973 | 5/1982 | Eskin et al. | 358/84 |
| 4,331,974 | 5/1982 | Cogswell et al. | 358/84 X |
| 4,337,463 | 6/1982 | Vangen . | |
| 4,346,427 | 8/1982 | Blissett et al. | 340/600 X |
| 4,404,589 | 9/1983 | Wright, Jr. . | |
| 4,425,578 | 1/1984 | Haselwood et al. | 358/84 |
| 4,567,511 | 1/1986 | Smith | 358/84 |
| 4,626,904 | 12/1986 | Lurie | 358/84 |
| 4,644,509 | 2/1987 | Kiewit et al. | 358/84 X |
| 4,652,915 | 3/1987 | Heller, III | 358/84 |
| 4,695,879 | 9/1987 | Weinblatt | 358/84 |

PASSIVE TELEVISION AUDIENCE MEASURING SYSTEMS

BACKGROUND OF THE INVENTION

1. Field of the Invention

The subject invention relates to television program and advertisement marketing research and rating services, to television viewer survey and response systems, to collecting, collating and evaluating television advertisement and program research data, including operation of television viewer evaluation and response panels, and to systems of determining preferences and quantities of television viewers in terms of broadcast television programs or advertisements.

2. Information Disclosure Statement

The folowing disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Statistically, television viewers across the United States watch television an average of 6.18 hours per day, or 7.3 hours for families with children. Deducting time for work and sleep, a very significant portion cf the lives of a population of over 200,000,000 people is thus taken up by an activity which is playing a substantial role for most people. Any improvement in the quality of such activity thus benefits a very significant aspect of contemporary American life.

The situation is rapidly assuming comparable proportions in many foreign countries, where television is becoming increasingly popular.

Since an increasing number of programs first shown on American television are now regularly televised in other countries as well, improvement of television program quality in the United States is assuming a global significance. Of course, with the proliferation of television channels at home and abroad, it is in each country's interest that those responsible for programming in any of several countries participating in a multinational exchange of television programming exercise utmost care in assuring top quality based on a realistic viewer response. In short, television program quality control is becoming a matter of multinational responsibility in the United States and in an increasing number of other countries.

Of course, such a responsibility cannot even be assumed, let alone discharged, without adequate tech nology for its implementation. Ideally, such a technology would be in tune with a self-regulating approach, where consumers, or here viewers, would through their feedback to the producer spark corrective and even creative activity by a true indication of their wants and needs. This would also have an ameliorative effect on television advertising or commercials, so that television advertisement surveyance and rating is important as well.

Early television program rating ystems which employed manually actualable response units practically required participating viewers to be assembled in an auditorium where a particular show or program was being displayed at the time the viewer reactions were taken, as may, for instance, be seen from U.S. Pat. No. 2,712,976, by P. H. Blaustein et al, issued July 12, 1955 for an audience reaction system. Such an approach is more attuned to motion pictures and theatrical performances, than to continuous television rating. In fact, it is not seen how realistic television ratings with real-life television viewer reaction would even be feasible when viewers are assembled together in an auditorium.

More realistic responses can be expected from the known rating services that utilize panels of television viewers in their homes in various parts of the country. However, there is increasing criticism that the rating system which has had the most severe impact on television programming has been carried on with little technological innovation over the years.

This despite the fact that there has been a proliferation of technological proposals, as may, for instance, be seen from British Pat. No. 1,389,717, by Intomart, N. V., published Apr. 9, 1975 for apparatus for determining the listening and viewing habits for radio and television receiver users, British Pat. No. 1,536,414, by A. F. Kaldor, published Dec. 20, 1978 for television audience survey systems, U.S. Pat. No. 2,958,766, by C. R. Evans, issued Nov. 1, 1960 for automatic audience rating systems, U.S. Pat. No. 2,985,498, by R. L. Freeman, issued May 23, 1961 for a compositing system, U.S. Pat. No. 3,012,179, by R. L. Freeman, issued Dec. 5, 1961 for a power failure indicating device, U.S. Pat. No. 3,056,135, by C. H. Currey et al, issued Sept. 25, 1962 for a method and apparatus for automatically determining the listening habits of wave signal receiver users, U.S. Pat. No. 3,070,798, by C. H. Currey et al, issued Dec. 25, 1962 for a system for determining the listening habits of wave signal receiver users, U.S. Pat. No. 3,088,093, by R. L. Freeman et al, issued Apr. 30, 1963 for wave signal receiver monitoring apparatus, U.S. Pat. No. 3,102,685, by M. R. Speiser et al, issued Sept. 3, 1963 for a voting machine, U.S. Pat. No. 3,143,705, by C. H. Currey et al, issued Aug. 4, 1964 for a system for determining whether local stations are transmitting network programs, U.S. Pat. No. 3,148,245, by C. H. Currey et al, issued Sept. 8, 1964 for a system for determining the listening habits of wave signal receiver users, U.S. Pat. No. 3,289,170, by C. H. Currey et al, issued Nov. 29, 1966 for a data transmitting and receiving system using pulse width modulation, U.S. Pat. No. 3,323,112, by D. E. Haselwood et al, issued May 30, 1967 for a data handling system, U.S. Pat. No. 3,372,233, by C. H. Currey, issued Mar. 5, 1968 for a horizontal and vertical sync signal comparison system, U.S. Pat. No. 3,405,393, by D. E. Haselwood, issued Oct. 8, 1968 for a data handling system, U.S. Pat. No. 3,408,629, by D. E. Haselwood, issued Oct. 29, 1968 for a data handling system, U.S. Pat. No. 3,387,797, by H. A. Rahmel et al, issued June 11, 1968 for a tape recorder, U.S. Pat. No. 3,453,641, by H. A. Rahmel, issued July 1, 1969 for an audience measuring system, U.S. Pat. No. 3,651,471, by D. E. Haselwood et al, issued Mar. 21, 1972 for a data storage and transmission system, U.S. Pat. No. 3,742,462, by D. E. Haselwood et al, issued June 26, 1973 for a data synchronizing unit for data transmission system, U.S. Pat. No. 3,742,463, by D. E. Haselwood et al, issued June 26, 1973 for a data storage and transmission system, U.S. Pat. No. 3,772,649, by D. E. Haselwood et al, issued Nov. 13, 1973 for a data interface unit for insuring the error free transmission of fixed-length data sets which are transmitted repeatedly, U.S. Pat. No. 3,919,479, by W. D. Moon et al, issued Nov. 11, 1975 for a broadcast signal identification system, U.S. Pat. No. 3,973,206, by D. E. Haselwood et al, issued Aug. 3, 1976 for a monitoring system for voltage tunable receivers and converters utilizing an analog function generator, U.S. Pat. No. 4,025,851, by D. E. Haselwood et al, issued May 24, 1977 for automatic monitor for programs broadcast, U.S. Pat. No. 4,038,504, by J. C. McAnulty et al, issued July 26, 1977 for a rotary, printed circuit wafer switch and method for adjusting, U.S. Pat. No. 4,048,562, by D. E. Haselwood et al, isued Sept. 13, 1977 for a monitoring system for voltage tunable receivers and converters utilizing voltage comparison techniques, U.S. Pat. No. 4,208,652, by R. Marshall, issued June 17, 1980 for a method and apparatus for identifying images, and U.S. Pat. No. 4,425,578, by D. E. Haselwood et al, issued Jan. 10, 1984 for a monitoring system and method utilizing signal injection for determining channel reception of video receivers.

Reference may also be had to U.S. Pat. No. 3,483,327, by A. Schwartz, issued Dec. 9, 1969 for a transponder for monitoring television program selections, U.S. Pat. No. 3,512,139, by A. C. Reynolds, Jr. et al, issued May 12, 1970 for a system and apparatus for automatic data collection, U.S. Pat. No. 3,815,127, by E. G. Blumke et al, issued June 4, 1974 for a data entry device, U.S. Pat. No. 4,041,455, by G. R. Norberg, issued Aug. 9, 1977 for an interrogation and monitoring system, U.S. Pat. No. 4,044,376, by J. L. Porter, issued Aug. 23, 1977 for a television monitor, U.S. Pat. No. 4,058,829, by J. R. Thompson, issued Nov. 15, 1977 for a television monitor, U.S. Pat. No. 4,298,860, by G. R. Norberg et al, issued Nov. 3, 1981 for a monitor and control apparatus, and U.S. Pat. No. 4,337,463, by R. F. Vangen, issued June 29, 1982 for a time synchronization master station and remote station system, U.S. Pat. No. 3,605,110, by D. C. Southward et al, issued Sept. 14, 1971 for events recorders for sending and recording changes primarily in the tuning of television receivers, U.S. Pat. No. 4,331,973, by G. J. Eskin et al, issued May 25, 1982 for a panelist response scanning system, U.S. Pat. No. 4,567,511, by P. E. Smith, issued Jan. 28, 1986 for transmitting and storing data relating to television viewing, and U.S. Pat. No. 3,733,430, by J. R. Thompson et al, issued May 15, 1973, for a channel monitoring system.

Those prior-art systems which rely on interviewing of selected television viewers by market researchers lack spontaneity and are very time consuming, so as to limit their widespread applicability. Accordingly, such approaches are often combined with systems that try to measure popularity on the basis of a determination of the individual channels to which selected television sets are tuned at particular times.

In practice, such systems, whether used alone or in conjunction with personal interviews, are becoming increasingly inaccurate if the polling cycle is longer than the average period during which television viewers will change channels, and if there is no safeguard of counting television sets as viewers, even if no one is watching while the television set is running in an empty room.

For a critical article on this subject, reference may be had to Joel Swerdlow, "The Ratings Game," (Washington Journalism Review, September-October 1979). The top illustration of that article shows television viewers having electrodes attached to their temples for determining what they really think about a television program they are watching. Hopefully, such a drastic viewer response system, even if technologically feasible, will never be acceptable. However, systems which determine reactions to television programs from the viewer's body in partial similarity to a polygraph lie detector have been proposed.

However, setups which impose changes on viewing habits or serious strictures on the participating viewers' comfort inherently tend to falsify survey results. This deficiency has been well summarized in a related area, where it has been stated that, "A particular problem is that the method of exposure of the selected group to the promotional material may skew the results; that is, the testing itself may influence the results independently of the material being tested," as pointed out in U.S. Pat. No. 4,331,974, by N. W. Cogswell et al, and U.S. Pat. No. 4,404,589, by W. A. Wright, Jr., issued, respectively, May 25, 1982 and Sept. 13, 1983, for cable television with controlled or multi-event signal substitution.

In the last ten years, great progress has been made with the type of system disclosed in U.S. Pat. Nos. 4,107,734 and 4,308,554 by R. D. Percy et al, issued respectively, Aug. 15, 1978 and Dec. 29, 1981, for television viewer reaction determining systems characterized by several features which make for high viewer spontaneity. For a sideline of that approach, reference may be had to U.S. Pat. No. 4,107,735, by H. F. Frohbach, issued Aug. 15, 1978 for television audience survey system providing feedback of cumulative survey results to individual television viewers, and providing graphic records of viewer responses for subsequent review.

Spontaneity and variety of viewer response were further enhanced by the type of method and apparatus disclosed in the allowed co-pending patent application 06/138,058, filed Apr. 7, 1980 by P. C. and R. D. Percy, for television viewer reaction determining systems, now U.S. Pat No. 4,646.145 issued Feb 24, 1987, and herewith incorporated by reference herein.

The latter systems permit viewers to express their opinions in various respects and to identify themselves to the data gathering facility. Viewers on a larger scale have been quite cooperative in operating the kind of response units disclosed in the latter patent application or patent. On the other hand, a system which operates without active viewer participation would have a broader appeal and would perhaps improve the quality of the rating data with respect to people who are either influenced in their response by the need of having to actuate a response unit or who have trouble operating such a unit accurately and reliably.

The subject invention is new and non-obvious as far as the combinations set forth in the claims thereof are concerned. However, technology for implementing individual elements of the claimed combinations may be borrowed from non-related or non-analogous art.

Reference may in this respect be had to U.S. Pat. No. 3,924,130, by A. Cohen et al, issued Dec. 2, 1975, for a body exposure indicator, U.S. Pat. No. 4,001,613, by V. E. Hills et al, issued Jan. 4, 1977 for a proximity sensing circuit, U.S. Pat. No. 4,196,425, by C. E. Williams et al, issued Apr. 1, 1980 for a patient activity monitoring system, and U.S. Pat. No. 4,346,427, by K. Blissett et al, issued Aug. 24, 1982 for a control device responsive to infrared radiation. The disclosures of these patents are herewith incorporated by reference herein.

The inability of the prior art to meet the problems solved by the subject invention stand in contrast to an ongoing proliferation of proposals which exceeds the above voluminous lists of references. The references cited in the above mentioned Frohbach and Percy et al patents or patent application, and in any other patent, for that matter, may further be consulted in this respect.

SUMMARY OF THE INVENTION

It is a general object of this invention to overcome the disadvantages and to meet the needs expressed or implicit in the above Information Disclosure Statement or apparent from other parts hereof.

It is a germane object of this invention to provide improved television program and advertisement marketing research and rating systems.

It is a related object of this invention to provide improved systems for collecting, collating and evaluating television advertisement and program research data.

It is also a related object of this invention to provide for an improved operation of television viewer evaluation and response panels.

It is a germane object of this invention to provide improved systems for determining preferences and quantities of television viewers in terms of broadcast television programs or advertisements.

It is a particular object of this invention to provide passive television audience measuring systems and improvements thereof.

Other objects of the invention will become apparent in the further course of this disclosure.

From a first aspect thereof, the subject invention resides in methods and apparatus for determining preferences of persons viewing broadcast television programs on television display sets located in rooms of private homes, and, more specifically, resides in the improvement comprising, in combination, the steps of, or means for, humanly imperceptibly sensing proximity of persons to television sets within viewing distance in rooms for which permission to effect such sensing has been obtained, automatically correlating such imperceptibly sensed proximity individually to television programs broadcast for display by television display sets in the above mentioned rooms and elsewhere, and electronically determining from that correlated sensing what broadcast television programs were viewed in which rooms.

From a related aspect thereof, the subject invention resides in methods and apparatus for determining preferences of persons viewing broadcast television programs on television display sets located in rooms of private homes, and, more specifically, resides in the improvement comprising, in combination, the steps of, or means for electrically scanning the rooms for a proximity of persons to television sets within viewing distance in rooms for which permission to effect such scanning has been obtained, automatically correlating a proximity of persons to television sets determined by that scanning individually to television programs broadcast for display by television display sets in such rooms and elsewhere, and electronically determining from that correlated determination of proximity of persons what broadcast television programs were viewed in which rooms.

Other objects and aspects of the invention will be mentioned or become apparent in the further course of this disclosure, and no restriction is intended by this short summary.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
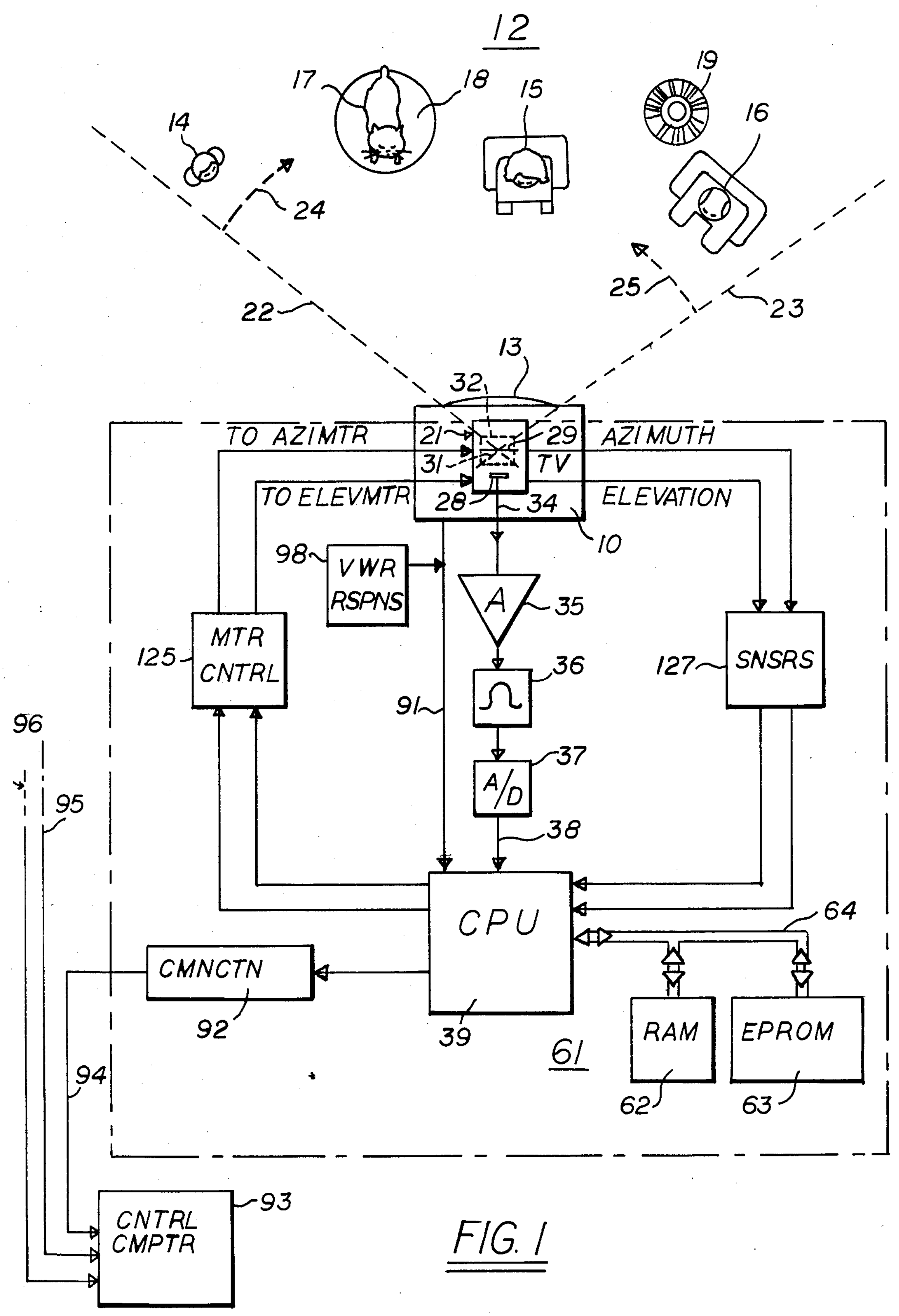
FIG. 1 is a top view of a populated room with a television display set, and a block diagram of apparatus for determining viewing population according to a preferred embodiment of the subject invention.

In FIG. 1, a television display set 10 is located in a room 12 of a private home, and has a cathode ray tube 13 for displaying broadcast television programs.

Several people 14, 15 and 16 are situated in the room for viewing broadcast television programs displayed by the set 10. By way of example, 14 may be a child, while 15 and 16 may be the mother and the father thereof. The family pet 17 is resting on an elevated table 18. A lamp 19 is switched off at the time, but could be switched on, such as for background illumination.

Of course, the scene 12 is only illustrative of a great variety of possible settings which so far have left advertising executives and television program evaluators quite frustrated. For instance, systems of the type shown in the above mentioned Kaldor patent have not worked out in practice, since it is simply too much to expect from the average household member that he or she regularly turn a personal switch "on" when entering the room, without forgetting to turn that personal switch "off" when leaving the room. Diary systems also have not proved reliable, since they tend to be somewhat elitist and would require rather strict adherence to the data entry procedure necessary for their successful operation.

While it may now appear that various monitoring systems, including those for sensing proximity or intrusion or monitoring patients, could have been used for audience surveyance purposes, it is to be remembered that any device that responds only to moving people would be quite useless for detecting the overwhelming majority of viewers that sit still while watching television.

Conversely, systems that respond only to people at rest would be at a loss to distinguish between viewers and stationary objects, such as lamps, heaters and the like, which, for instance, emit the kind of infrared radiation detectable from people or, depending on the mode of detection, have similar dielectric or other detectable properties.

The embodiment illustrated in FIG. 1 is an example of a system according to the subject invention for electrically scanning the rooms for a proximity of persons to television sets within viewing distance in rooms for which permission to effect such scanning has been obtained. Such scanning is herein said to be electrical, in contradistinction to diary systems and similar procedures in which a person would visually scan the room for persons therein.

As apparent in the further course of this disclosure, the system according to a preferred embodiment of the invention automatically correlates a proximity of persons to television sets determined by the scanning individually to television programs broadcast for display by television display sets 10 in the rooms 12 and elsewhere, and electronically determines from that correlated determination of proximity of persons what broadcast television programs were viewed in which rooms.

The practical example according to FIGS. 1 to 4 may be helpful at this juncture for an understanding of the subject invention and some of its embodiments.

In particular, an electrical passive people detector 21 scans the room 12, such as within a range indicated by dotted lines 22 and 23 and by directional arrows 24 and 25. The people detector 21 may be mounted on the ceiling of the room 12 or may be positioned on the television set 10, to name two examples.

In one embodiment pursuant to the subject invention, the detector 21 includes a detecting element 28 and a focusing device 29. As indicated by crossed dotted lines 31, the detector or focusing device may scan from left to right or vice versa, as determined by azimuths desired to be covered in the room 12. As indicated by a dotted rectangle 32, the detector or focusing device is tilted up and down as required by various elevations desired to be covered in the practice of the subject invention.

Preferably, humanly imperceptible sensing is employed in the practice of the subject invention. In principle, this may, for instance, include infrared sensing. Infrared sensing is presently preferred as the best mode. The expression electromagnetic sensing is herein employed to refer to infrared and other sensing done by electromagnetic waves, such as invisible infrared radiation emanating from human bodies and other sources of similar infrared radiation.

The detection of such infrared or other employed radiation proceeds electrically or electronically, with the detector 28 supplying a corresonding electric signal along an output lead 34 thereof. That electric detector output signal is amplified by an amplifer 35, filtered by a bandpass filter 36 and digitized by an analog-to-digital converter 37 to provide a digital signal in a lead 38 to a central processing unit (CPU) 39. Examples of detector output signals are shown in FIG. 2.

Figure 2:
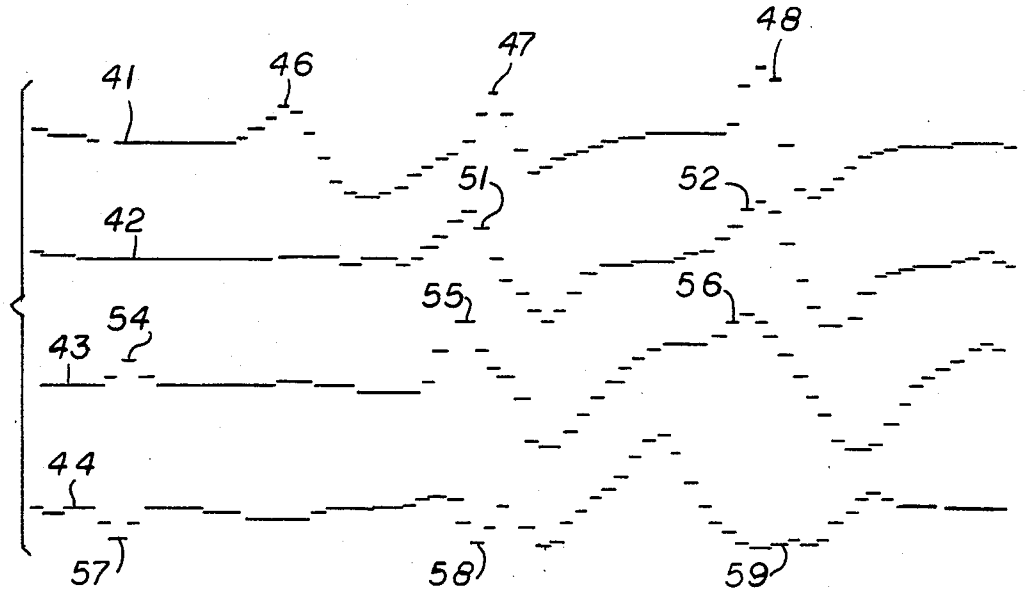
FIG. 2 is a printout of a series of curves representing the results of a scanning of the room of FIG. 1 with equipment and according to the method of a preferred embodiment of the invention illustrated with the aid of FIGS. 1, 5 and 6.

In particular, curves 41, 42, 43 and 44 in FIG. 2 are plots of electric output signals of the detector 28 during scans of the detector 21 between 22 and 23 at four different elevations in the room 12.

As may be seen from plot 41, the detector 21 at 46 picked up the family pet 17 on the elevated table 18, at 47 picked up the head region of the mother 15 and at 48 the head region of the father 16. Since the child 14 is small, the detector 21 did not pick up that child during its first scan at the highest elevation. The same applies to the plot 42, where the detector 21 also did not pick up the pet 17 anymore, since the table 18 is located above the second scan elevation. However, the detector 21 at 51 and 52 picked up the chest portion of the mother 15 and father 16, respectively.

During its third scan resulting in the plot 43, the detector at 54 did pick up the head of the child 14, and at 55 and 56 the lower body regions of the mother 15 and father 16. During its fourth or lowest scan, represented by the plot 44, the detector 21 picked up the feet of the child 14, mother 15 and father 16 at 57, 58 and 59, respectively.

In principle, conclusions as to the size and number of persons watching could already be drawn from the plots 41 to 44. However, in order to facilitate that task, the data processing facility 61 shown in FIG. 1 performs a pattern recognition function with the aid of a random access memory (RAM) 62 and an erasable programmable read only memory (EPROM) 63, connected to each other and to the CPU 39 by a bus 64. In principle, the pattern recognition function could be carried out at the central computer facility which collects the data from participating homes. However, bandwidth requirements are generally reduced, and precision of recognition tends to be augmented, if at least part of the pattern recognition function is performed in each home, preferably in the detector unit 21.

The pattern recognition operation carried out on the output signals of the detector 21 may be a state-of-the-art process and need not involve invention as such, even though improvements over the years are not to be ruled out.

Figure 3:
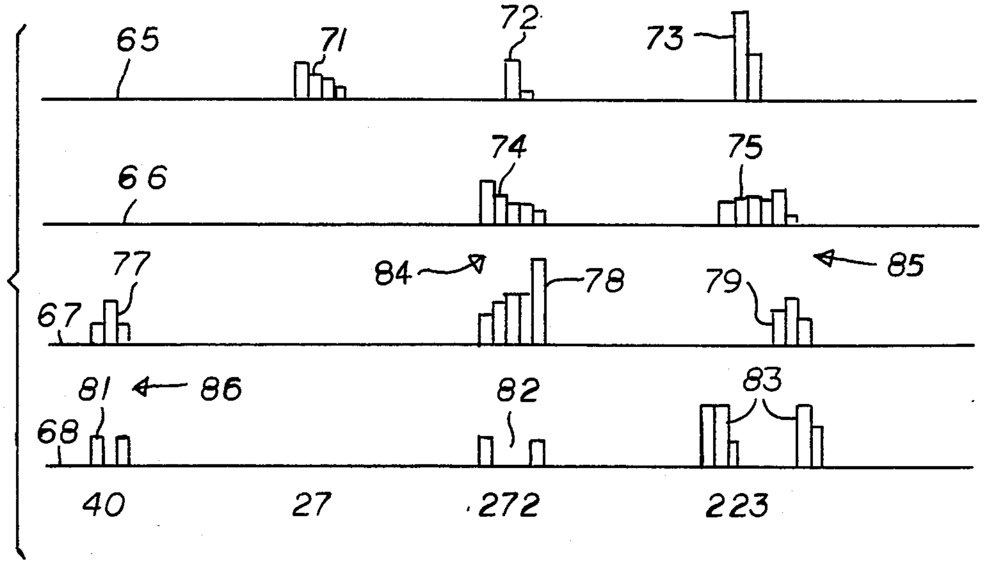
FIG. 3 is a printout of the result of a pattern recognition according to an embodiment of the invention, illustrated with the aid of FIG. 1.

FIG. 3 and its plots 65, 66, 67 and 68 represent in effect digitized versions of FIG. 2 and its analog plots 41, 42, 43 and 44, respectively. As known in the field of pattern recognition, these are versions of the analog detector output signal digitized in terms of certain patterns which deliberately neglect lower rates of change in order to clarify the resulting patterns. For this purpose, the EPROM 63 contains a sample pattern, known as "signature," which represents what is considered the pattern of a person or person-like heat source in the context of the system shown in FIG. 1. The RAM 62, which receives the values represented by the plots 41 to 44, the EPROM 63, which contains the signature pattern and informaion thereon, and the CPU 39 then interact to perform a pattern recognition function of the type shown in FIG. 3.

In particular, the plot 65 shows the pet 17, the head portion of mother 15, and the head portion of father 16 at 71, 72, and 73, respectively. The plot 66 shows patterns 74 and 75 of the chest region of mother 15 and father 16. The plot 67 shows patterns 77, 78, and 79 of the head region of the child 14 and the lower body regions of mother 15 and father 16. Finally, the plot 68 in FIG. 3 shows patterns 81, 82 and 83 representing the leg regions of child 14, mother 15 and father 16.

The plots of FIGS. 2 and 3 contain no indication of the lamp 19, since that lamp was not turned on in this particular case. However, if the lamp had been turned on, then the system shown in FIG. 1 would handle it similarly to the pet 17, as more fully described below.

In particular, the data processing system shown in FIG. 1 now evaluates the pattern 71, the group 84 of patterns 72, 74, 78 and 82, the group 85 of patterns 73, 75, 79 and 83, and the couple 86 of patterns 77 and 81. According to the illustrated preferred embodiment of the subject invention, the data processing facility 61 then assigns a characteristic number to each pattern or pattern group thus evaluated.

As shown at the bottom of FIG. 3, the values 40, 27, 272, and 223 are assigned to the pattern group 86, pattern 71, group 84, and group 85, respectively.

According to another aspect of the subject invention, these values or numbers are employed for providing a confidence level that a sensed being or object actually is a person.

In particular, the detector 21 or equivalent equipment may be employed for sensing the proximity of persons to the television set 10 first coarsely, as, for instance indicated by the plots of FIGS. 2 and 3. Also according to the illustrated embodiment of the invention, the system then establishes a confidence level needed for a conclusion that a coarsely sensed proximity is equivalent to an actually sensed proximity of a person to a television set within viewing distance. In practice, this may be done in the EPROM 63 in conjunction with the CPU 39 and RAM 62.

By way of example, the EPROM 63 may store the number 70 as indicating the lower threshold of a high confidence level, the numbers 50 to 69 as representing a medium confidence level, and the numbers 35 to 49 as indicating a low confidence level that a picked-up object or being is actually a person.

In the illustrated preferred embodiment, the numbers 40, 27, 272, and 223 in effect indicate how closely the pattern recognitions match the thermal characteristics of a person in the room 12. The above mentioned high, medium, and low confidence numbers stored in the EPROM 63 or otherwise in the system 61 then indicate different levels of confidence. The number of persons in the room 12 is then determined from coarse sensing reaching at least a given confidence level.

In the illustrated preferred embodiment of the invention, detection of the family pet 17 produces only the number 27, as shown at the bottom of FIG. 3. This does not even reach the lower threshold of the low confidence level. Accordingly, the CPU 39 throws out the cat when adding up the count of persons in the room. On the other hand, the detected mother 15 and father 16 are recognized with high confidence as persons in the room 12 proximate to the television set 10.

The child 14 presents a somewhat special case. With a rating of 40, the child commands only a low confidence level. In practice, this will go into the evaluation. For instance, if the evaluation concerns a commercial or television advertisement, the system may be programmed to eliminate persons that only show up at a low confidence level, since they may not have enough purchasing power to command a meaningful response. This, of course, depends on the circumstances and also on the insight, knowledge and perception of the evaluator. For instance, persons showing up in the medium confidence level range may well be "tweens," comprising children in the 8 to 14 age range, which through their parents exert considerable buying power in the fast food market and other relevant areas.

Also, if dad habitually sits near his reading lamp 19, the CPU 39 could be programmed to conclude that a person 16 spotted at that location is, indeed, the father, rather than the mother 15 or child 14. This opens up a new vista for television rating and market research.

Moreover, what is important in terms of confidence level depends on the kind of program being broadcast at the time, since there certainly is a distinction in this respect between mere entertainment, educational programs, and commercial or television advertisement.

The subject invention and its embodiments are capable of accomnodating all these different evaluation needs and processes.

Figure 4:
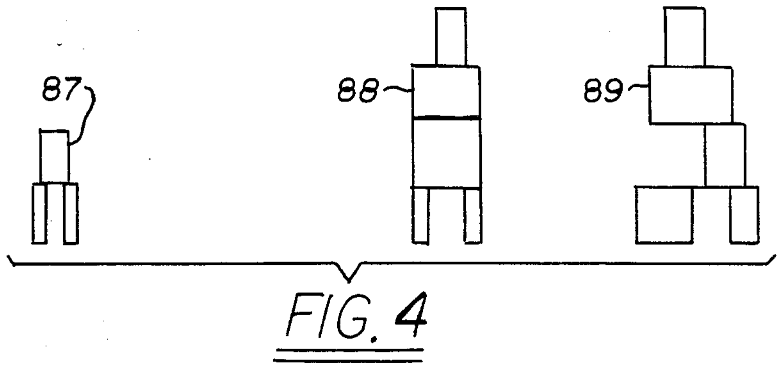
FIG. 4 is a printout of the result of an optional pattern recognition activity pursuant to a preferred embodiment of the subject invention.

FIG. 4 shows the result of a further pattern recognition operation carried out by the data processing equipment 61 pulling together the different patterns of FIG. 3. As a result, stylized versions 87, 88 and 89 of the persons 14, 15 and 16 appear on the printout made available by the components 39, 62 and 63 to the program evaluator. An important point according to the subject invention is that there is no intrusion into the privacy of any participating home. No photographs are taken and no actual pictures are transmitted. To the contrary, the subject invention deliberately goes by proximity and confidence levels.

For instance, considering the preferred embcdiment of the invention so far described, it may be said that the detector 21 and the equipment immediately connected thereto effects the proximity sensing first coarsely, while the system 61 establishes a confidence level needed for a conclusion that a coarsely sensed proximity is equivalent to an actually sensed proximity of a person to a television set within that viewing distance. For instance, as may be seen from FIGS. 3 and 4, the mother 15 and father 16 would be counted as whole persons by the CPU 39. On the other hand, as seen toward the left-hand side of FIGS. 3 and 4, and as explained above, the system 61 establishes for each coarse sensing falling short of the higher confidence level a probability that such ccarse sensing is a sensing of a person in proximity to a television set within viewing distance.

That sensed probability is then expressed in terms of a fraction of a sensed person, such as by the rating of 40, as distinguished from the above mentioned high rate of 70 and above. The CPU may then determine the number of persons by adding up the counted whole persons and the expressed fractional persons. On the other hand, depending on the needs of the system, such determination may be effected at the centralized computer facility.

As mentioned above, the imperceptively sensed proximity of persons is automatically correlated individually to television programs broadcast for display by television display sets in the participating rooms and elsewhere. A line 91 in FIG. 1 indicates means for transmitting information of the condition and channel selection of the set 10 to the CPU 39, for transmission of such information through a communication facility 92 to the central data processing, computer and evaluation facility 93 serving all participating homes at a central location. A line 94 communicates collected data from the communication facility 92 to the central computer 93, while lines 95 and 96 perform the same function for other participating homes. By way of example, the lines 94, 95, 96, etc., may be telephone lines to which the CPU 39 is connected periodically by the communication equipment 92. In that case, the CPU or memory facilities in the equipment 92 may be employed for storing data over a period of time, for transmission at a convenient moment to the central computer 93. Reference may in this respect be had to the above mentioned Percy et al and Frohbach patents, which are herewith incorporated by referenece herein.

As indicated at 98 in FIG. 1, the kind of viewer response system disclosed in the above mentioned Percy et al patents and in references cited therein may be employed in the practice of the subject invention as well. As there disclosed, such viewer response systems permit participating viewers to key in their reaction to television programs or to passages thereof at a minute-by-minute or even second-by-second frequency. In that case, the subject invention makes those collected viewer reactions much more meaningful by indicating how many people were watching at the time each reaction was keyed in.

In this manner, the subject invention opens up a variety of different possible evaluation processes, all of which lead to more perceptive and precise evaluation and thereby to a compulsion for better programming all around.

Even the simplest function of th computer 93 of electronically determining from correlated and collated sensing what broadcast television programs were viewed in which homes or rooms, already presents the program evaluator and developer with a powerful tool for better and better television. That function is further augmented according to the subject invention by the above mentioned determination of what broadcast television programs were viewed in which rooms by how many persons. Automatical correlation to broadcast television programs may be effected with the sum of the added-up whole and fractional persons whose proximity was imperceptibly sensed according to the subject invention and preferred embodiments thereof.

As an important point, even the participating people are passive for the imperceptible sensing of their presence and number. This favorably distinguishes systems according to the subject invention from personal switching and diary systems which unrealistically depend on a high reliability and constant participation of television viewers, which simply cannot consistently be realized in practice.

The practice of the subject invention is not limited to any scanner or any particular detector. However, an electrical or electromechanical scanner according to a preferred embodiment of the invention is shown in FIGS. 5 and 6.

Figure 5:
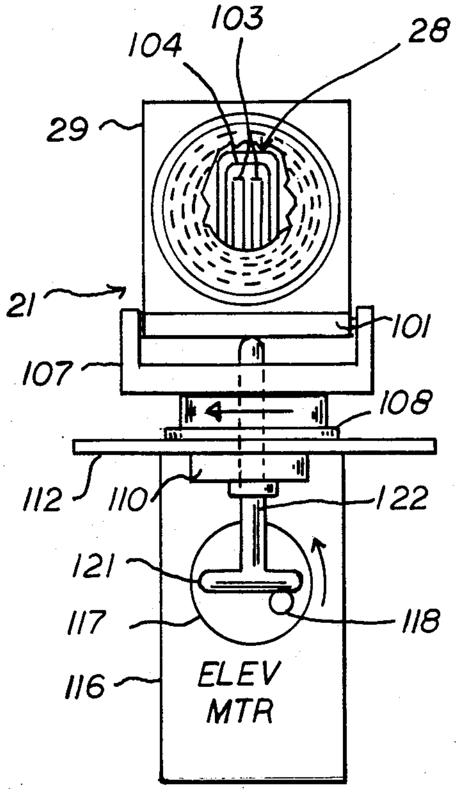
FIG. 5 is an elevation of a room scanner according to an embodiment of the invention, and usable in the embodiment of FIG. 1.
Figure 6:
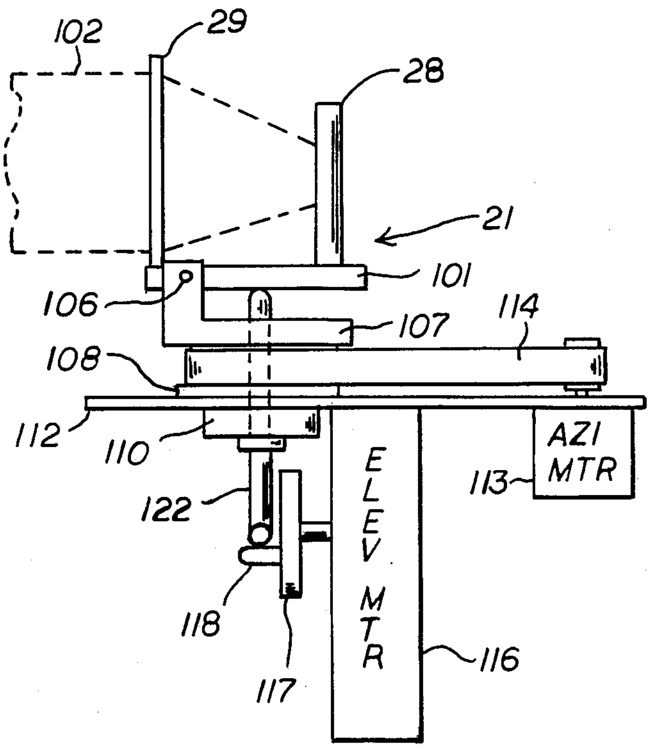
FIG. 6 is a side view of the scanner of FIG. 5.

In the embodiment shown in FIGS. 5 and 6, the detector element 28 and focusing or collecting lens 29 are mounted on a platform 101. By way of example, a Fresnel lens may be employed at 29 for collecting in-coming infrared rays 102 from people and sources of similar infrared radiation in the room, and for projectirg such collected radiation onto the sensor parts of the detector element 28. A pair of such sensor parts 103 is provided to permit a differential sensor function, such as with the aid of a differential amplifier at 35, whereby only relatively moving infrared radiation sources are sensed. In this respect, the persons 14 to 16 may be stationary, since the necessary relative movement is supplied by the scanning detector 21.

The sensor parts 103 preferably are located behind a window 104 through which only infrared radiations within a desired bandwidth are transmitted. By way of example, a germanium window which is only transmissive to the kind of heat infrared radiations emitted by human beings may be provided at 104.

The platform 101 is pivoted at 106 on a support bracket 107. That bracket, in turn, is mounted on top of a wheel 108 which my be integral with the bracket 107.

A bushing 110 rotatably mounts the wheel 108 on a base 112, which may be part of a housing of the scanning detector 21.

Scanning of the type shown at 22 to 25 in FIG. 1 is in the embodiment of FIGS. 5 and 6 effected with the aid of an Azimuth motor 113 which angularly moves the wheel 108 and thereby the bracket 107 via a belt 114. The infrared detector is thus scanned laterally over an area sufficient to detect people in proximity of a television set.

An elevation motor 116 is provided for adjusting the detector to different scanning elevations. That motor 116 angularly moves a wheel 117 having a crank pin 118 projecting therefrom. The crank pin 118 acts on the horizontal bar 121 of a vertical rod 122. That rod extends through central apertures in the bushing 110, wheel 108 and bracket 107, and impinges upon a lower surface of the platform 101 at a distance from the pivot 106.

The detector is elevated by rotation of the disc 117 in a clockwise direction, and is conversely lowered by angular movement of that disc in a counterclockwise direction, as seen in FIG. 5.

As shown in FIG. 1, the CPU 39 may drive a motor control 125 which, in turn, selectively energizes the Azimuth and elevation motors 113 and 116.

The type of scanning indicated in FIG. 1 at 22 to 25, and represented in FIG. 2 by the elevational levels at 41 to 44, may thus, by way of example, be carried out by the detector 21. For increased precision, a timing belt may be employed at 114, and the wheel 108, as well as the pulley of the Azimuth motor 113 may be correspondingly dented.

A stepping motor may be employed at 116, as desired or suitable.

Limit switches and azimuth and elevation sensors 127 may be employed as shown in FIG. 1 in order to inform the CPU 39 continuously of the exact azimuth and elevational location of the scanning sensor, as necessary and supportive of the precise kind of scanning and pattern recognition function illustrated in FIGS. 2 to 4.

Motor control and sensing functions may be combined within the scope of the subject invention, if the azimuth and elevational drives are very precise.

The scanning detector 21 includes means, such as those shown in FIGS. 5 and 6, for scanning any room at different elevations. As shown in FIG. 1 and explained above with the aid of FIGS. 2 and 3, with or without FIG. 4, means are connected to the scanning detector for detecting each person from the scanning at different elevations. As seen, for instance, from FIGS. 2 and 3, particularly at 54, 57, 77 and 81, 47, 51, 55, 58, 72, 74, 78 and 82, and 48, 52, 56, 59, 73, 75, 79 and 83, the means shown in FIG. 1 integrate scans at different elevations at like azimuths for a detection or identification of persons, such as those schematically shown at 87, 88 and 89.

The system or apparatus of embodiments or aspects of the subject invention may also be employed for sensing, detecting or counting people in contexts other than those emphasized above. For instance, that aspect of the invention may reside broadly in apparatus for determining presence of persons in a predetermined area, including the improvement comprising, in combination, the detector 21 or equivalent means for electrically scanning the room 12 or an area therein for a presence of persons, and the data processing facility 61 or equivalent means for determining from that scanning a number of persons present in that area.

In practice, the data processing facility 61 may be contained in the same housing as the scanning detector 21.

Other features described above with the aid of FIGS. 1 to 6 may also be employed in embodiments of the latter aspect of the subject invention. In those cases, what has been expressed above in terms of proximity of persons to television sets within viewing distance may be rephrased as a presence of persons in a predetermined area.

In this manner, it is possible to determine automatically at any relevant time the number of people that stand still at a display window or at any other exhibit, the effectiveness of which is to be evaluated by advertising people, decorators, or other professionals. Since the detector 21 and data processing facility 61 will not count those as persons present, who move by significantly more swiftly than the speed of the scanner, the subject invention is well able to distinguish between moving people on the one hand and people that remain at least somewhat stationary in an area, on the other hand. Further distinctions can be drawn by varying the scanning rate.

In practice, this is not only important in the evaluation of television programs, various forms of advertising and interest in all kind of displays, but can also be significant in other areas.

Take, for instance, a passageway or similar area in an airport where people move through rather swiftly. If, contrary to such routine, one or more persons stand still for any length of time, it would be helpful to alert security people at a central station to such occurrence, so that they can determine whether some hijacking or terrorist activity might be building up, especially if that happened at several points in the airport more or less simultaneously. One significant advantage of such a system is that it will not be disturbed by regularly moving passengers.

This is, of course, only one more example of the wide utility of the subject invention.

In fact, the subject extensive disclosure will render apparent or suggest to those skilled in the art various modifications and variations within the spirit and scope of the subject invention and equivalents thereof.

We claim:

1. In a method of determining preferences of persons viewing broadcast television programs on television display sets located in rooms of private homes, the improvement comprising in combination:

humanly imperceptibly sensing proximity of persons to television sets within viewing distance in rooms for which permission to effect said sensing has been obtained, by sensing invisible infrared radiation emanating from human bodies and other sources of infrared radiation in said rooms;

automatically correlating said imperceptibly sensed proximity individually to television programs broadcast for display by television display sets in said rooms and elsewhere; and electronically determining from said correlated sensing what broadcast television programs were viewed in which rooms.

2. A method as claimed in claim 1, wherein:

said persons are passive for said imperceptible sensing.

3. A method as claimed in claim 1, including the steps of:

determining from said imperceptibly sensed proximity the number of persons within said viewing distance; and electronically determining from said correlated sensed proximity and determined number of persons what broadcast television programs were viewed in which rooms by how many persons.

4. A method as claimed in claim 3, wherein:

said persons are passive for said imperceptible sensing.

5. A method as claimed in claim 3, including:

performance of a pattern recognition function on signals produced by said sensing for determining the number of persons within said viewing distance.

6. A method as claimed in claim 3, including the steps of:

effecting said proximity sensing first coarsely;

establishing a confidence level needed for a conclusion that a coarsely sensed proximity is equivalent to an actually sensed proximity of a person to a television set within said viewing distance; and determining said number of persons from coarse sensings reaching at least said confidence level.

7. In a method of determining preference of persons viewing broadcast television programs on television display sets located in rooms of private homes, the improvement comprising in combination:

humanly imperceptibly sensing proximity of persons to television sets within viewing distance in rooms for which permission to effect said sensing has been obtained by effecting said proximity sensing first coarsely;

establishing a confidence level needed for a conclusion that a coarsely sensed proximity is equivalent to an actually sensed proximity of a person to a television set within said viewing distance;

counting each course sensing reaching said confidence level as a sensing of a whole person in proximity to a television set within viewing distance;

establishing for each coarse sensing falling short of said confidence level a probability that such coarse sensing is a sensing of a person in proximity to a television set within viewing distance;

expressing said probability in terms of a fraction of a sensed person;

determining from said imperceptibly sensed proximity the number of persons within said viewing distance by adding up the counted whole persons and the expressed fractional persons;

automatically correlating said imperceptibly sensed proximity individually to television programs broadcast for display by television display sets in said rooms and elsewhere; and electronically determining from said correlated sensed proximity and determined number of persons what broadcast television programs were viewed in which rooms by how many persons.

8. A method as claimed in claim 1, including the steps of:

effecting said proximity sensing first coarsely, establishing a confidence level needed for a conclusion that a coarsely sensed proximity is equivalent to an actually sensed proximity of persons to television sets within said viewing distance; and establishing said imperceptibly senses proximity for said correlating whenever said coarse sensing at least reaches said confidence level.

9. In a method of determining preferences of persons viewing broadcast television programs on television display sets located in rooms of private homes, the improvement comprising in combination:

humanly imperceptibly sensing proximity of persons to television sets within viewing distance in rooms for which permission to effect said sensing has been obtained, by effecting said proximity sensing first coarsely;

establishing for any coarse sensing of a person a confidence level needed for a conclusion that said coarse sensing is actually a sensing of a person in proximity to a television set within viewing distance in any of said rooms;

counting each coarse sensing reaching said confidence level as a sensing of a whole person in proximity to a television set within viewing distance in any of said rooms;

establishing for each coarse sensing falling short of said confidence level a probability that such coarse sensing is a sensing of a person in proximity to a television set within viewing distance in any of said rooms;

expressing said probability in terms of a fraction of a sensed person;

adding up the counted whole persons and the expressed fractional persons; and effecting said automatic correlating with the sum of added-up whole and fractional persons as said imperceptibly sensed proximity;

automatically correlating the latter imperceptibly sensed proximity individually to television programs broadcast for display by television display sets in said rooms and elsewhere; and electronically determining from said correlated sensing what broadcast television programs were viewed in which rooms.

10. In a method of determining preferences of persons viewing broadcast television programs on television display sets located in rooms of private homes, the improvement comprising in combination:

electrically scanning said rooms for a proximity of persons to television sets within viewing distance in rooms for which permission to effect said scanning has been obtained, by sensing during said scanning infrared radiation emanating from human bodies and other sources of infrared radiation in said rooms;

automatically correlating a proximity of persons to television sets determined by said scanning individually to television programs broadcast for display by television display sets in said rooms and elsewhere; and electronically determining from said correlated determination of proximity of persons what broadcast television programs were viewed in which rooms.

11. A method as claimed in claim 10, including:

determining from said scanning the number of persons within said viewing distance; and electronically determining from said correlated determination of proximity and number of persons what broadcast television programs were viewed in which rooms by how many persons.

12. A method as claimed in claim 11, including the steps of:

sensing said proximity coarsely during said scanning;

establishing a confidence level needed for a conclusion that a coarsely sensed proximity is equivalent to an actually sensed proximity of a person to a television set within said viewing distance; and determining from said scanning said number of persons from coarse sensing reaching at least said confidence level.

13. In a method of determining perferences of persons viewing broadcast television programs on television display sets located in rooms of private homes, the improvement comprising in combination:

electrically scanning said rooms for a proximity of persons to television sets within viewing distance in has been obtained and sensing said proximity coarsely during said scanning;

establishing a confidence level needed for a conclusion that a coarsely sensed proximity is equivalent to an actually sensed proximity of a person to a television set within said viewing distance;

counting each coarse sensing reaching said confidence level as a sensing of a whole person in proximity to a television set within viewing distance;

establishing for each coarse sensing falling short of said confidence level a probability that such coarse sensing is a sensing of a person in proximity to a television set within viewing distance;

expressing said probability in terms of a fraction of a sensed person;

determining from said scanning said number of persons within said viewing distance by adding up the counted whole persons and the expressed fractional persons;

automatically correlating a proximity of persons to television sets determined by said scanning individually to television programs broadcast for display by television display sets in said rooms and elsewhere; and electronically determining from said correlated determination of proximity and number of persons what broadcast television programs were viewed in which rooms by how many persons.

14. A method as claimed in claim 10, including the steps of:

sensing said proximity coarsely during said scanning;

establishing a confidence level needed for a conclusion that a coarsely sensed proximity is equivalent to an actually sensed proximity of persons to television sets within said viewing distance; and establishing said proximity for said correlating whenever said coarse sensing at least reaches said confidence level.

15. In a method of determining preferences of persons viewing broadcast television programs on television display sets located in rooms of private homes, the improvement comprising in combination:

electrically scanning said rooms for a proximity of persons to television sets within viewing distance in rooms for which permission to effect such scanning has been obtained, by sensing said proximity coarsely from invisible infrared radiation emanating from human bodies and other sources of infrared radiation during said scanning;

establishing for any coarse sensing a confidence level needed for a conclusion that said coarse sensing is actually a sensing of a person in proximity to a television set within viewing distance;

counting each coarse sensing reaching said confidence level as a sensing of a whole person on proximity to a television set within viewing distance;

establishing for each coarse sensing falling short of said confidence level a probability that such coarse sensing is a sensing of a person in proximity to a television set within viewing distance;

expressing said probability in terms of a fraction of a sensed person;

adding up the counted whole persons and the expressed fractional persons; and effecting said automatic correlating with the sum of said added-up whole and fractional persons as said proximity of persons determined by said scanning;

automatically correlating a proximity of persons to television sets determined by said scanning individually to television programs broadcast for display by television display sets in said rooms and elsewhere; and electronically determining from said correlated determination of proximity of persons what broadcast television programs were viewed in which rooms.

16. In apparatus for determining preferences of persons viewing broadcast television programs on television display sets located in rooms of private homes, the improvement comprising in combination:

means for humanly imperceptibly sensing proximity of persons to television sets within viewing distance in predetermined ones of said rooms including means for sensing invisible infrared radiation emanating from human bodies and other sources of infrared radiation in said rooms;

means, connected to said means for sensing invisible infrared radiation, for automatically correlating said imperceptibly sensed proximity individually to television programs broadcast for display by television display sets in said rooms and elsewhere; and means connected to said correlating means for electronically determining from said correlated sensing what broadcast television programs were viewed in which rooms.

17. Apparatus as claimed in claim 16, including:

means connected to said sensing means for determining from said imperceptibly sensed proximity the number of persons within said viewing distance; and means connected to said correlating means and to said means for determining said number of persons, for electronically determining from said correlated sensed proximity and determined number of persons what broadcast television programs were viewed in which rooms by how many persons.

18. Apparatus as claimed in claim 17, wherein:

said means for determining said number of persons include means for performance of a pattern recognition function on signals produced by said sensing for determining the number of persons within said viewing distance.

19. Apparatus as claimed in claim 17, wherein:

said sensing means include means for effecting said proximity sensing coarsely;

means for establishing a confidence level needed for a conclusion that a coarsely sensed proximity is equivalent to an actually sensed proximity of a person to a television set within said viewing distance; and means connected to said coarse sensing means and said confidence level establishing means for determining said number of persons from coarse sensings reaching at least said confidence level.

20. In apparatus for determining preferences of persons viewing broadcast television programs on television display sets located in rooms of private homes, the improvement comprising in combination:

means for humanly imperceptibly sensing proximity of persons to television sets within viewing distance in predetermined ones of said rooms, including means for effecting said proximity sensing coarsely;

said apparatus including means for establishing a confidence level needed for a conclusion that a coarsely sensed proximity is equivalent to an actually sensed proximity of a person to a television set within said viewing distance;

means connected to said coarse sensing means and to said confidence level establishing means for counting each coarse sensing reaching said confidence level as a sensing of a whole person in proximity to a television set within viewing distance;

means connected to said confidence level establishing means for establishing for each coarse sensing falling short of said confidence level a probability that such coarse sensing is a sensing of a person in proximity to a television set within viewing distance and for expressing said probability in terms of a fraction of a sensed person; and means connected to said coarse sensing means, said counting means and said means for expressing said probability for determining said number of persons within said viewing distance by adding up the counted whole persons and the expressed fractional persons;

means for automatically correlating said imperceptibly sensed proximity individually to television programs broadcast for display by television display sets in said rooms and elsewhere; and means connected to said correlating means and to said means for determining said number of persons for electronically determining from said correlated sensed proximity and determined number of person what broadcast television programs were viewed in which rooms by how many persons.

21. Apparatus as claimed in claim 16, wherein:

said sensing means include means for effecting said proximity sensing coarsely;

means for establishing a confidence level needed for a conclusion that a coarsely sensed proximity is equivalent to an actually sensed proximity of persons to television sets within said viewing distance; and means connected to said confidence level establishing means for establishing said imperceptibly sensed proximity for said correlating whenever said coarse sensing at least reaches said confidence level.

22. In apparatus for determining preferences of persons viewing broadcast television programs on television display sets located in rooms of private homes, the improvement comprising in combination:

means for humanly imperceptibly sensing proximity of persons to television sets within viewing distance in predetermined ones of said rooms, including means for effecting said proximity sensing coarsely;

means for establishing for any coarse sensing of a person a confidence level needed for a conclusion that said coarse sensing is actually a sensing of a person in proximity to a television set within viewing distance in any of said rooms;

means connected to said coarse sensing means and to said confidence level establishing means for counting each coarse sensing reaching said confidence level as a sensing of a whole person in proximity to a television set within viewing distance in any of said rooms;

means connected to said confidence level establishing means for establishing for each coarse sensing falling short of said confience level a probability that such coarse sensing is a sensing of a person in proximity to a television set within viewing distance in any of said rooms and for expressing said probability in terms of a fraction of a sensed person;

means connected to said coarse sensing means, said counting means and said means for expressing said probability for adding up the counted whole persons and the expressed fractional persons;

means for automatically correlating said imperceptiblity sensed proximity individually to television programs broadcast for display by television display sets in said rooms and elsewhere;

means connected to said correlating means for electronically determining from said correlated sensing what broadcast television programs were viewed in which rooms; and means connected to said adding means and said correlating means for effecting said automatic correlating with the sum of said added-up whole and fractional persons as said imperceptibly sensed proximity.

23. In apparatus for determining preferences of persons viewing broadcast television programs on television display sets located in rooms of private homes, the improvement comprising combination:

means for electrically scanning said rooms for a proximity of persons to television sets within viewing distance in predetermined ones of said rooms including means for sensing invisible infrared radiation emanating from human bodies and other sources of infrared radiation in said rooms;

means, connected to said means for sensing invisible infrared radiation, for automatically correlating a proximity of persons to television sets determined by said scanning and sensing individually to television programs broadcast for display by television display sets in said rooms and elsewhere; and means connected to said correlating means for electronically determining from said correlated determination of proximity of persons what broadcast television programs were viewed in which rooms.

24. Apparatus as claimed in claim 23, wherein:

said scanning means include means for performance of a pattern recognition function on signals produced by said scanning and sensing for determining from said scanning and sensing the number of persons within said viewing distance.

25. Apparatus as claimed in claim 24 wherein:

said scanning means include means for sensing said proximity coarsely during said scanning;

means for establishing a confidence level needed for a conclusion that a coarsely sensed proximity is equivalent to an actually sensed proximity of a person to a television set within said viewing distance; and means connected to said confidence level establishing means for determining from said scanning said number of persons from coarse sensing reaching at least said confidence level.

26. In apparatus for determining preferences of persons viewing broadcast television programs on television display sets located in rooms of private homes, the improvement comprising in combination:

means for electrically scanning said rooms for a proximity of persons to television sets within viewing distance in predetermined ones of said rooms including means for sensing said proximity coarsely during said scanning;

said apparatus including means for establishing a confidence level needed for a conclusion that a coarsely sensed proximity is equivalent to an actually a sensed proximity of a person to a television set within said viewing distance;

means connected to said coarse sensing means and to said confidence level establishing means for counting each coarse sensing reaching said confidence level as a sensing of a whole person in proximity to a television set within a viewing distance;

means connected to said confidence level establishing means for establishing for each corase sensing falling short of said confidence level a probability that such coarse sensing is a sensing of a person in proximity to a television set within viewing distance and for expressing said probability in terms of a fraction of a sensed person;

means connected to said coarse sensing means, said counting means and said means for expressing said probability for determining from said scanning the number of persons within said viewing distance by adding up the counter whole persons and the expressed fractional persons;

means for automatically correlating a proximity of persons to television sets determined by said scanning individually to television programs broadcast for display by television display sets in said rooms and elsewhere; and means connected to said means for determining said number of persons and to said correlating means for electronically determining from said correlated determination of proximity and number of persons what broadcast television programs were viewed in which rooms by how many persons.

27. Apparatus as claimed in claim 23, wherein:

said scanning means include means for sensing said proximity coarsely during said scanning;

said apparatus including means for establishing a confidence level needed for a conclusion that a coarsely sensed proximity is equivalent to an actually sensed proximity of persons to television sets within said viewing distance; and means connected to said confidence level establishing means for establishing said proximity for said correlating whenever said coarse sensing at least reaches said confidence level.

28. In apparatus for determining preferences of persons viewing broadcast television programs on television display sets located in rooms of private homes, the improvement comprising in combination:

means for electrically scanning said rooms for a proximity of persons to television sets within viewing distance in predetermined ones of said rooms including means for sensing said proximity coarsely during said scanning;

said apparatus including means for establishing for any coarse sensing a confidence level needed for a conclusion that said coarse sensing is actually a sensing of a person in proximity to a television set within viewing distance;

means connected to said coarse sensing means and to said confidence level establishing means for counting each coarse sensing reaching said confidence level as a sensing of a whole person in proximity to a television set within viewing distance;

means connected to said confidence level establishing means for establishing for each coarse sensing falling short of said confidence level a probability that such coarse sensing is a sensing of a person in proximity to a television set within viewing distance and for expressing said probability in terms of a fraction of a sensed person;

means connected to said coarse sensing means, said counting means and said means for expressing said probability for adding up the counter whole persons and the expressed fractional persons;

means for automatically correlating a proximity of persons to television sets determined by said scanning individually to television programs broadcast for display by television display sets in said rooms and elsewhere, including means connected to said adding means and said correlating means for effecting said automatic correlating with the sum of said added-up whole and fractional persons as said proximity of persons determined by said scanning; and means for electronically determining from said correlated determination of proximity of persons what broadcast television programs were viewed in which rooms.

29. Apparatus as claimed in claim 23, wherein:

said scanning means include means for scanning said rooms at different elevations; and means connected to said scanning means for detecting each person from said scanning at different elevations.

30. Apparatus as claimed in claim 29, wherein:

said detecting means include means for integrating scans at different elevations at like azimuths.

31. In apparatus for determining presence of persons in an audience in a predetermined area, the improvement comprising in combination:

means for electrically scanning said area for a presence of persons therein including means for sensing invisible infrared radiation emanating from human bodies and other sources of infrared radiation in said area and means, connected to said means sensing invisible infrared radiation, for determining from said scanning how many persons are present in said area.

32. Apparatus as claimed in claim 31, wherein:

said scanning means include means for sensing said presence coarsely during said scanning;

said apparatus including means for establishing a confidence level needed for a conclusion that a coarsely sensed presence is equivalent to an actually sensed presence of persons in said area; and means connected to said confidence level establishing means for determining said presence whenever said coarse sensing at least reaches said confidence level.

33. In apparatus for determining presence of persons in a predetermined area, the improvement comprising in combination:

means for electrically scanning said area for a presence of persons therein, including means for sensing said presence coarsely during said scanning;

said apparatus including means for establishing a confidence level needed for a conclusion that a coarsely sensed presence is equivalent to an actually sensed presence of a person within said area;

means connected to said coarse sensing means and to said confidence level establishing means for counting each coarse sensing reaching said confidence level as a sensing of a whole person present in said area;

means connected to said confidence level establishing means for establishing for each coarse sensing falling short of said confidence level a probability that such coarse sensing is a sensing of a person present in said area, and for expressing said probability in terms of a fraction of a sensed person; and means connected to said scanning means for determining from said scanning a number of persons present in said area, including means connected to said coarse sensing means, said counting means and said means for expressing said probability for determining from said scanning said number of persons by adding up the counter whole persons and the expressed fractional persons.

34. Apparatus as claimed in claim 31, wherein:

said scanning means include means for scanning said area at different elevations; and means connected to said scanning means for detecting each person from said scanning at different elevations.

35. Apparatus as claimed in claim 34, wherein:

said detecting means include means for integrating scans at different elevations at like azimuths.

* * * * *